United States Patent Office 3,252,720
Patented May 24, 1966

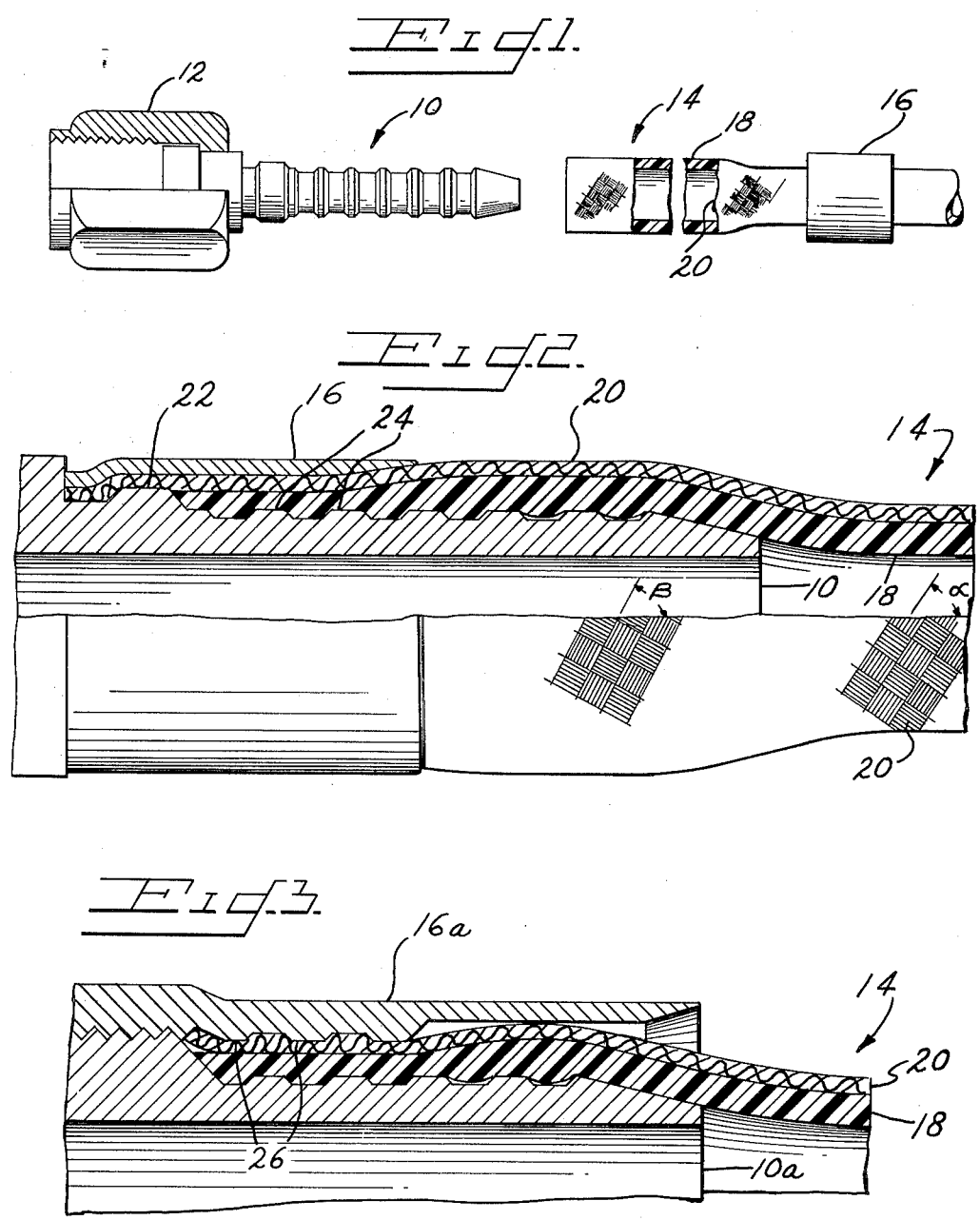

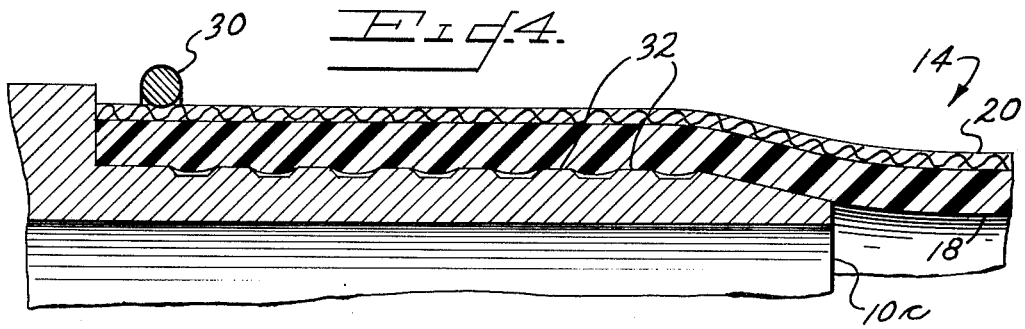
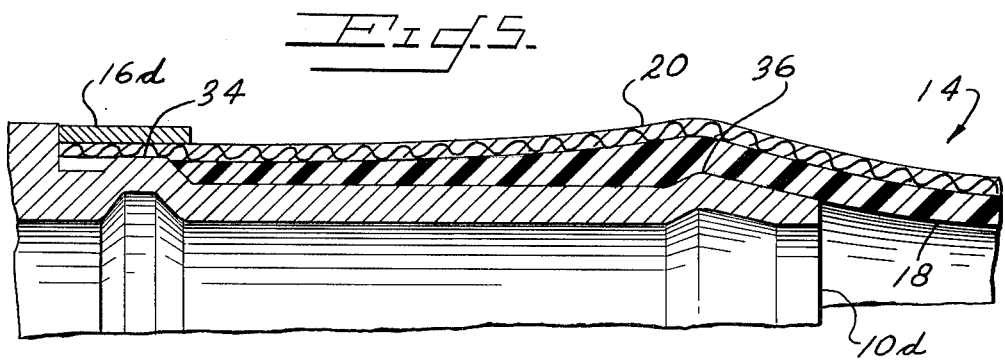
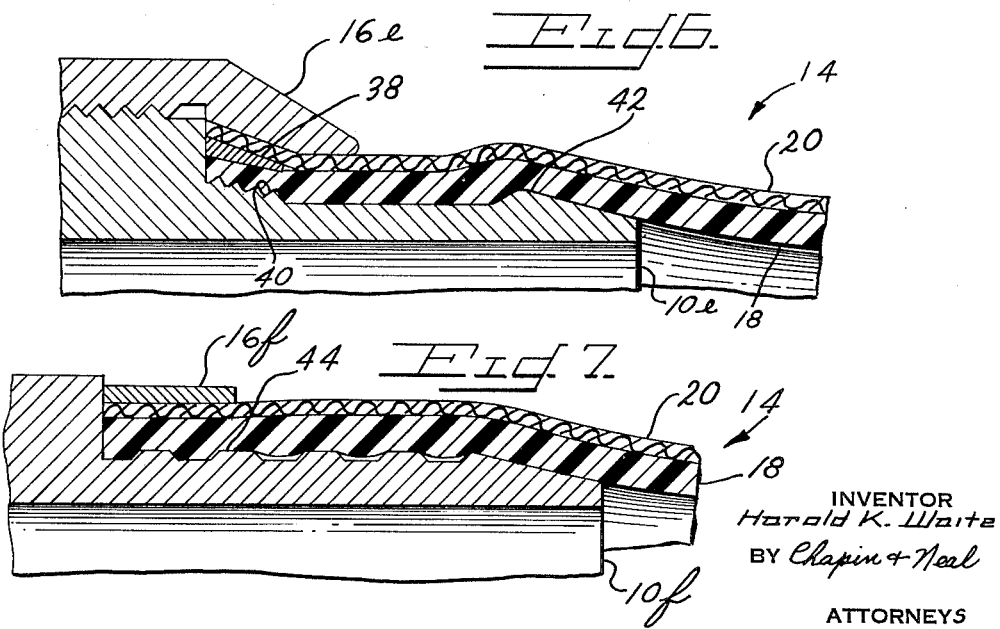

3,252,720
SWIVEL-TYPE HOSE COUPLING
Harold K. Waite, East Longmeadow, Mass., assignor to Atlas Corporation, New York, N.Y., a corporation of Delaware
Filed Mar. 27, 1963, Ser. No. 268,236
2 Claims. (Cl. 285—256)

The present invention relates to improvements in the attachment of wire braid covered hose to end fittings.

The object of the invention is to substantially increase the working pressures for end fittings, particularly over long periods of use under fluctuating temperature and pressure conditions.

Another object is to provide a simple and effective swivel joint.

A further object is to simplify and reduce the cost of such end fittings.

For many years it has been recognized that definite shortcomings existed in attaching end fittings to flexible hose comprising an impervious liner encased within a woven wire braid. The problems are especially peculiar to such hose where the liner is formed of plastic materials which do not fully recover their original shape after being displaced under conditions of heat and/or temperature. Such materials are exemplified by nylon and polytetrafluoroethylene, the latter material being available from E. I. du Pont de Nemours & Co., under the trademark "Teflon", and hereinafter referred to as PTFE. The patent art shows many different designs for attaching end fittings to the type of hose referred to, all of which are based upon the provision of a socket formed by an insert and a collar into which socket the hose is telescoped. A compressive force is then applied against the hose to compress both the braids and the liner into corrugations formed on the collar and the insert. The compression is obtained either by expanding the insert or by compressing as by swaging the collar.

An end fitting attached in this fashion will initially have a very high strength. However, it is to be recognized that when the fitting was attached there was a very substantial displacement or cold working of the plastic liner material which causes internal stresses of the material that will eventually result in the formation of cracks and a consequent failure over a given period of time. Also, it must be recognized that in many instances these fittings are used under conditions where temperature and pressure conditions fluctuate widely and often rapidly, causing an expansion and contraction of the metal and the plastic material as well. The liner materials referred to have many desirable properties, but are not true elastomeric materials, which means that eventually the plastic material will be squeezed from the socket in which it is confined and a leakage path will result.

Therefore, in a more limited sense, the object of the invention is to overcome the problems which exist in the attachment of end fittings to wire braid reinforced flexible hose having an inner lining formed of PTFE or other materials having similar elastomeric properties.

These ends are attained by the simple and effective expedient of providing an end fitting which comprises an insert which is telescoped within one end of a flexible hose with the insert being dimensioned so as to expand the wire braid so that its helix angle is such that internal fluid pressure within the hose will cause the braid to contract in diameter and sealingly grip the end of the insert.

The above and other related objects and features of the invention will be apparent from a reading of the following description of the disclosure found in the accompanying drawings and the novelty thereof pointed out in the appended claims.

In the drawings:
FIG. 1 is an elevation, partly in section, showing a hose and end fitting positioned for assembly;
FIG. 2 shows, on an enlarged scale, the end fitting of FIG. 1 in assembled relation;
FIG. 3 illustrates in fragmentary section, an alternate embodiment of the invention;
FIG. 4 illustrates in fragmentary section, another alternate embodiment of the invention;
FIG. 5 illustrates in fragmentary section, yet another alternate embodiment of the invention;
FIG. 6 illustrates in fragmentary section, still another alternate embodiment of the invention; and
FIG. 7 illustrates a modification of the embodiment of FIG. 4.

Referring first to FIGS. 1 and 2, the present end fitting comprises an insert 10 having a locking nut 12 at one end thereof for attaching the end fitting to a pipe connector or the like. A wire braid reinforced flexible hose 14 is shown positioned for assembly with the end fitting, that is, to be telescoped over the insert 10. A sleeve or collar 16 is telescoped over the hose 14 before the latter is assembled with the end fitting.

The present invention has particular significance in the connection of end fittings to flexible hose in which a liner or impervious PTFE membrane 18 is encased within a sheath 20 of woven wire braid. As indicated above, utility of the invention is not limited to this material except as it is illustrative of a material which is not truly elastomeric, as later discussion will more fully point out.

As a preliminary to the assembly operation, it is preferable that the outer end of the hose first be enlarged by a balling tool or the like (see FIG. 1), and then telescoped over the insert 10, as indicated in the assembly, shown in FIG. 2. Preexpansion of the hose will minimize, if not eliminate, the possibility of the liner being scratched and resultant failures from such scratches. The sleeve 16 is then brought to the outer end of the hose, and reduced in diameter by swaging or crimping to lock the extreme outer end of the hose relative to the insert 10.

In FIG. 2 it will be particularly noted that the liner 18 is preferably either cut away or the sheath 20 is stretched therebeyond over a circumferential ridge 22 so that the sleeve 16 firmly locks the sheath 20 against the insert 10. Further locking action is obtained as the end of the sleeve is crimped and locks the braid against the inner side of the ridge 22 as well. There is also some compression of the liner 18 against in insert 10 so that circumferential ridges 24 of a lesser height are impressed into the liner 18. It is to be noted that a substantial length of the hose overlying what will be referred to as the outer end of the insert 10 is unconstrained and that the hose itself is expanded to a greater diameter than that of its main portion beyond the insert.

The angle of the plaits of the woven sheath 20 is of great importance in the present invention. It is known that a hose of this type in which the braid angle of the plaits is approximately 34° will neither elongate nor contract when carrying fluid under pressure. "Braid angle" is a term of art which may be more conveniently referred to as the approximate complement of the helix angle so that reference will be made to a no-motion braid as having a helix angle of approximately 56°, as measured relative to the longitudinal axis of the hose. If the helix angle is greater than 56° the wire hose would elongate and its diameter contract when subject to internal fluid pressures. Conversely, if the helix angle is less than 56° the hose would shorten and its diameter would expand when subject to internal fluid pressures.

Referring again to FIG. 2, it will be seen that the hose 14 in its unexpanded condition, to the right of the insert 10, has a helix angle α of approximately 56° for the plaits of the sheath 20. That portion of the hose which hase been expanded over the outer end of the insert 10, now has a helix angle β of greater than 56° for the plaits of the sheath 20.

The fitting of FIG. 2 is intended primarily as an extremely high pressure end fitting where operating pressures are in the range of 3,000 p.s.i. and burst pressures may be as high as 20,000 p.s.i. The described fitting actually provides three means of preventing failure: First, the braid is mechanically locked against the ridge 22 to prevent the hose from blowing off the insert 10; second, a low pressure seal is provided by the compression of the liner 18 into sealing engagement with the ridges 24 at the inner insert 10; third, and of greatest importance, when the hose 14 is subject to internal fluid pressure, that portion of the hose which has been expanded over the outer end of the insert 10 now elongates due to the helix angle of the sheath 20 and in elongating contracts in diameter to force the material of the liner 18 into sealing engagement with the insert 10.

Presumably the sealing engagement occurs over a relatively short axial length just adjacent the outer end of the insert 10 or adjacent the point where there is a noticeable elongation of the hose due to the change in helix angle, to an angle substantially greater than 56°.

Put another way, the helix angle at some point along the length of the unconstrained portion of the hose over the insert 10 must be substantially greater than 56°. It is preferable that the normal helix angle of the casing be 56° so that it will neither elongate nor contract when it is expanded and telescoped over the insert 10, the desired sealing action will be obtained without any adverse effect on the operating characteristics of the main portion of the hose. However, it is possible that the length of the hose may not be critical in a given installation so that a braid angle of less than 56° might be employed. If it were, the hose would normally shorten and the diameter of the hose expand when carrying pressurized fluids. Even so, if this hose is expanded sufficiently when telescoped over the insert 10 so that the helix angle becomes greater than 56°, the automatic sealing action above described will be obtained.

The embodiment of FIG. 3 is essentially the same as that of FIG. 2, except that a shorter insert 10a is employed with a sleeve 16a threadably secured thereto. The sleeve 16a illustrates the use of internal ridges 26 which have been compressed into the sheath 20 by swaging the sleeve. This gives a low pressure seal and also locks the sheath to prevent blow off. The sleeve 16a also has an extension which projects to the outer end of the insert 10a. This outer extension of the sleeve 16a does not provide any substantial sealing action. It is primarily for appearance sake to conform with the conventionally accepted outlook that the sealing sleeve must be of substantial length. Actually in FIG. 3 the hose has been expanded sufficiently when telescoped over the insert 10a that the helix angle of the sheath 20 is greater than 56° and thus an effective sealing action is obtained at the outer end of the insert 10a when pressurized fluid is introduced therein.

The departure from the conventionally accepted appearance of an end fitting is more effectively illustrated in FIG. 4 where it will be seen that an insert 10c has been telescoped within the end of the hose 14 and the only constraining means provided is a small ring 30 having the sole function of preventing the sheath 20 from unraveling. There, of course, is a substantial expansion of the hose itself to telescope it over the insert 10c so as to provide an effective sealing action between the liner 18 and circumferential ridges 32 on the insert 10c. This sealing action prevents leakage at lower pressures which are not sufficient to obtain a sealing effect from a reduction in the diameter of the hose, as previously described.

It has been found that the medium pressure sealing action of the embodiment of FIG. 4 is just as effective as any of the previous embodiments and more effective than conventionally attached end fittings in preventing leakage. It will be recognized, however, that the embodiment of FIG. 4 will probably not be employed in extremely high pressure applications due to the fact that a substantial axial force will be developed which would probably tend to pull the hose off of the insert 10c. This being referred to as "blow-off." As pointed out, the embodiment of FIG. 2 particularly takes care of blow-off by confining the sheath 20 against the ridge 22.

The embodiment of FIG. 4 provides an unexpected advantage in that it can act as a swivel joint. Thus, the insert 10c may rotate relative to the hose 14 without affecting the sealing properties of the fitting. Rotation may be made either before installation or in an operating system, thus enabling fittings at opposite ends of a hose to be angularly positioned in a very simple manner. This feature also eliminates the need for expensive swivel joints which have previously been employed. The low friction characteristics of the PTFE material forming the liner are of particular value in obtaining these advantages, and as to this feature the liner material is of significant importance and limited to PTFE or other materials having equivalent friction and sealing characteristics.

FIG. 5 illustrates yet another embodiment of the invention somewhat similar to FIG. 2 in that the sheath 20 is locked against a rib 34 on an insert 10d by a relatively short crimped sleeve 16d. The feature to be noted in FIG. 5 is that the multitude of ribs 24 has been eliminated and only one rounded circumferential enlargement 36 is employed in forming a sealing action. Advantageously the insert 10d may be formed from a tube by a spinning operation. This is primarily to point out the fact that the configuration of the outer surface of any of the inserts 10 is not necessarily critical. The shape illustrated in FIG 5 has advantages in that there are no sharp edges which would cause stress concentrations and ultimate failure in the liner 18.

FIG. 6 simply illustrates a reusable end fitting wherein the outer sleeve 16e is extremely short and is threadably connected to an insert 10e. The sheath 20 is locked against a tapered ring 38. Ridges or threads 40 are formed on the insert 10e to provide a low pressure seal and an enlargement 42 at the outer end of the insert facilitates obtaining a high pressure seal as the hose 14 is expanded thereover.

FIG. 7 illustrates a modified embodiment of FIG. 4, which also functions as a swivel. The hose 14 is telescoped over an insert 10f which is substantially shorter than the insert 10c. A sleeve 16f is swaged or crimped to force the liner 18 into grooves on the insert 10f which are defined by ridges 44. The extent to which the liner 18 is compressed by sleeve 16f is balanced to provide adequate low pressure sealing and yet permit rotation of the insert 10f relative thereto. Thus with a shorter insert, this more positive low pressure sealing means is preferred. As before, the expanded portion of hose has the plaits of its sheath 20 on a helix angle greater than 56°. Thus when the internal pressure is sufficiently high to cause a change in the helix angle of the plaits, the automatic sealing action is obtained.

It will again be noted that in each of the embodiments the hose 14 is expanded as it is telescoped over the insert. The helix angle is increased by this expansion to an angle greater than 56° to obtain a medium and high pressure sealing action as previously described. It will be seen that this sealing action is obtained by the clamping action of the sheath and not by attempting to force the plastic liner into a confined space as is the conventional practice in obtaining a seal. Thus the pressures that would cause flow of the plastic are minimized and even if flow does occur the flexible gripping action of the sheath will still provide an effective seal. This being in accordance with the above stated object of obtaining effective seals where the liner material is not a true elastomer.

It will also be pointed out that the sheath 20 is referred to as a wire braid sheath which normally connotes that a metallic wire is employed. However, there are other wire materials having similar characteristics which are equivalent and included within the intended scope of this term, Dacron being an example.

Having thus described the invention, what is claimed as novel and desired to be secured by Letters Patent of the United States is:

1. An end fitting assembly comprising in combination with a flexible hose having an inner liner of PTFE or like material, which does not fully recover its original shape after displacement under conditions of heat and pressure, and covered with a woven wire braid having a helix angle of 56°, and insert telescoped within one end of the hose and holding the hose diameter expanded and the helix angle of the wires in the area of said insert at an angle greater than said 56° helix angle, and a collar engaging the wire braid adjacent the outer end of the hose, said hose being rotatable on said insert for swivel action.

2. An end fitting as in claim 1 wherein the insert is provided with a series of circumferential ridges forming grooves spaced axially of its length and said collar at the end of the hose holds the liner material compressed into at least one of the grooves spaced from the end of the insert to provide a low pressure seal.

References Cited by the Examiner

UNITED STATES PATENTS

| | | | |
|---|---|---|---|
| 1,630,895 | 5/1927 | Herbst | 138—127 X |
| 2,171,945 | 9/1939 | Norgren | 285—256 |
| 2,198,996 | 4/1940 | Guarnaschelli | 285—256 X |
| 2,384,635 | 9/1945 | Melsom | 285—256 X |
| 2,805,088 | 9/1957 | Cline et al. | 285—239 |
| 2,829,671 | 4/1958 | Ernst et al. | 138—130 X |
| 2,973,975 | 3/1961 | Ramberg et al. | 285—256 X |
| 3,011,525 | 12/1961 | Randle et al. | 138—126 |
| 3,093,160 | 6/1963 | Boggs | 138—125 X |
| 3,140,106 | 7/1964 | Thomas et al. | 285—256 X |

FOREIGN PATENTS

| | | |
|---|---|---|
| 1,160,833 | 3/1958 | France. |
| 556,385 | 10/1943 | Great Britain. |

CARL W. TOMLIN, *Primary Examiner.*

THOMAS F. CALLAGHAN, *Examiner.*